(12) United States Patent
Nambudiri (10) Patent No.: US 9,922,224 B1
(45) Date of Patent: Mar. 20, 2018

(54) METHOD AND SYSTEM FOR IDENTIFYING AND AUTHENTICATING AN OBJECT

(71) Applicant: Narayan Nambudiri, Bangalore (IN)

(72) Inventor: Narayan Nambudiri, Bangalore (IN)

( * ) Notice: Subject to any disclaimer, the term of this patent is extended or adjusted under 35 U.S.C. 154(b) by 0 days.

(21) Appl. No.: 15/438,242

(22) Filed: Feb. 21, 2017

(51) Int. Cl.
*G06K 19/06* (2006.01)
*G06K 7/14* (2006.01)
*G06K 7/10* (2006.01)

(52) U.S. Cl.
CPC ....... *G06K 7/1417* (2013.01); *G06K 7/10722* (2013.01)

(58) Field of Classification Search
USPC ........................................ 235/380, 375, 487
See application file for complete search history.

(56) References Cited

U.S. PATENT DOCUMENTS

| | | | |
|---|---|---|---|
| 6,692,031 B2 | 2/2004 | McGrew | |
| 7,364,074 B2 | 4/2008 | He et al. | |
| 9,685,021 B2 * | 6/2017 | Auger | G07D 7/20 |
| 2004/0203170 A1 * | 10/2004 | Barbera-Guillem | A61K 9/167 |
| | | | 436/164 |
| 2007/0262154 A1 * | 11/2007 | Zazzu | G06K 7/12 |
| | | | 235/487 |
| 2009/0250629 A1 * | 10/2009 | Kim | G01N 21/6428 |
| | | | 250/459.1 |
| 2010/0114780 A1 * | 5/2010 | Tribe | G06Q 10/06375 |
| | | | 705/50 |
| 2010/0199232 A1 * | 8/2010 | Mistry | G06F 1/163 |
| | | | 715/863 |
| 2013/0087620 A1 | 4/2013 | Sharma et al. | |
| 2013/0170758 A1 * | 7/2013 | G | G06K 19/086 |
| | | | 382/218 |
| 2014/0180479 A1 * | 6/2014 | Argue | B25J 9/0093 |
| | | | 700/259 |
| 2016/0196509 A1 * | 7/2016 | Whitaker | G06Q 10/02 |
| | | | 705/5 |
| 2016/0247008 A1 * | 8/2016 | Lewis | G06K 7/10732 |
| 2017/0132690 A1 * | 5/2017 | Todd | G06Q 30/0633 |

* cited by examiner

*Primary Examiner* — Allyson Trail (57) ABSTRACT

A system for identifying and authenticating an object includes an indicium having randomly applied fluorophores that emit light when excited. The fluorophores produce a unique, random pattern that uniquely identifies any object to which the indicium is attached. The indicium may also include an identification code. An imaging unit with a flash excites and captures the photo-luminescence of the indicium in the form of a random image. The identification and authentication of the object is done by sending the image captured via a mobile phone or other device such as a laptop or notepad to a server of an authentication unit via the Internet or other communication media to correlate with a reference image of the indicium captured at the time of manufacture. This assures the authenticity of the product with a high degree of confidence.

11 Claims, 5 Drawing Sheets

METHOD AND SYSTEM FOR IDENTIFYING AND AUTHENTICATING AN OBJECT

TECHNICAL FIELD OF THE INVENTION

The present invention relates to a system and method for the unique identification and authentication of objects using a combination of identifiers applied to the object. One of the identifiers is a randomly applied material with a unique property, and the other identifier is a machine-readable serial number, e.g. a two-dimensional barcode.

BACKGROUND OF THE INVENTION

Consumers worldwide face the menace of counterfeit products in the marketplace. Counterfeit products run the gamut from medicines and food to electronic goods. Manufacturers attempt to combat this by using various anti-counterfeiting methods to authenticate or confirm the genuineness of their products. These methods include taggants, holograms, and other forms of labels. These methods or technologies comprise the overt type which are visible to the consumer, and the covert type which cannot be seen and can only be detected using detectors or readers that are specifically designed to detect and authenticate them. The hologram is an example of the overt type as it allows the consumer to authenticate the product visually, while taggants are generally of the covert type, which require special equipment for detection. The problem with most of these methods is that the counterfeiter is also able to duplicate the anti-counterfeiting technology. In cases where proprietary equipment is used, consumers are often unable to authenticate the product, as they may not have access to the equipment due to cost, size, or other factors. This has led to a race between anti-counterfeiting technology developers and counterfeiters; the technologists develop new methods to prevent counterfeiting while the counterfeiters try to duplicate the new technologies. In the end, it is consumers who suffer the consequences of this menace.

There are many existing patents and patent applications that talk about the various methods for identifying and authenticating products.

U.S. Pat. No. 7,364,074 entitled "Method of authenticating products using analog and digital identifiers" discloses a method of identifying or authenticating a product by providing an analog identification indicium, including a randomized pattern of identification features on a first part of the product wherein one or more attributes of the randomized pattern of identification features correspond to an item identifier. A digital identification record is provided on a second part of the product, including an encoded digital version of the item identifier, the first and second parts being separable when the product is used. The randomized pattern of identification features of the analog identification indicium is read and decoded to generate an item identifier and the digital identification record is read and decoded to generate an item identifier. Here, the normal user i.e. the customer is not empowered to read the identification feature because proprietary readers are required for the same.

Another U.S. patent application, No. U.S. 20130087620 A1, discloses a method of, and system and label for, authenticating objects in situ. It discusses the creation of an authentication pattern signature for the object to be authenticated. In this method a random distribution of multiple, three-dimensional elements is associated with the object, and a portable, handheld, image capture device is aimed at the object to capture the scattered light from the elements. Then the images are checked to ensure that the elements are three-dimensional, and the processed to generate an image pattern of the elements. This image pattern is then compared with the authentication pattern signature, and the device indicates that the object is authentic when the image pattern matches the authentication pattern signature. With the advent of digital 3D printing it may be possible to duplicate these labels.

Another U.S. Pat. No. 6,692,031 discloses a Quantum dot security device and method. Quantum dots are used as fluorescent taggants in security inks, papers, plastics, explosives, or any other item or substance in which it is required to provide a distinct signature or marking. Quantum dots of specific sizes, compositions and structures may be used to produce a specific fluorescence, mixtures of quantum dots can be used to produce random patterns of spectrally varying fluorescence, and particular quantum dot structures can be used to provide desirable physical and optical properties. Here, the method detects specific emitted wavelength and fluorescence timing. This form of detection requires the use of a sophisticated reader.

Hence, there is need for a method and system where the user is provided with a facility to check the authenticity of the object or a product in an easy to use and cost effective manner.

BRIEF SUMMARY OF THE INVENTION

According to an embodiment, the present invention discloses a method for authenticating and identifying an object. The method includes the steps of applying an indicium on the object, wherein the indicium is a combination of an identification code and a label containing fluorophores particles of size in the nanometer range in a random pattern. The method further has a step of capturing an image of indicium using an image-capturing device. The said device has an illumination source like a flash and the fluorophores in the label are excited with the help of the flash before capturing the image. The image captured has the identification code along with the fluorescence pattern formed by the excited fluorophores in the label. The method also has the step of determining the authenticity of the indicium by comparing the image captured with a reference image available in a server database, wherein the server database has the images of all indicium indexed with the identification code.

The identification code includes one or more of the product serial number, model number, batch number, manufacturing date, expiry date, price, country of sale, or other product identity related information that identifies or relates to the product, which may be machine-readable by an electronic reader or scanner. For example, the identification code can be in the form of a linear barcode (e.g. EAN-8, EAN-13 per ISO/IEC 15420), a matrix or two-dimensional (2D) barcode (e.g. Data Matrix or QR Code) or an RFID chip/tag (Radio-frequency identification).

According to an embodiment, the indicium can be a combination of at least one of the identification codes embossed on top of the random pattern of fluorophores on the label. Alternatively, the random pattern of fluorophores can be embossed on top of the identification code on the label, or the identification code and random pattern of fluorophores can be next to each other on the label.

According to an embodiment, the step of correlation is performed in the following manner. The image-capturing device captures a sequence of images of the indicium image in unexcited and excited states, wherein the combination of the image captured before excitation and after excitation is used for correlation in determining the authenticity of the indicium.

According to an embodiment, the image-capturing step further utilizes at least one filter that attenuates the illumination from the excitation source and passes the emission from the fluorophores or enhances the sensitivity of the image capturing to the emissions from the fluorophores.

According to an embodiment, the present invention discloses a system for authentication and identification of an object. The system includes an indicium applied on the object. The indicium is a combination of an identification code and a label with fluorophores in a random pattern. The system also has an image-capturing unit with an image-capturing device and a flash, wherein the flash excites the fluorophores in the label and the image-capturing device captures the image formed by the excited fluorophores along with the identification code of the indicium. The system also has a communication unit to transmit the captured indicium to an authentication unit for the authentication. The authentication unit gets stored image from a server database with a plurality of indicia image used in a plurality of objects. The indicia image is indexed with the identification code. The authentication unit authenticates the captured image by correlating the captured image with respect to the stored image and transmits the result of authentication to the communication unit.

According to an embodiment, the image-capturing device is one of a smart phone with a digital camera and a flash. The image-capturing device further has at least one filter to attenuate the excitation of the flash while allowing the emission from the fluorophores to enter it.

The present invention provides an economical and easy to use system and a method of authenticating an object. Here the consumer or user is able to authenticate the object or product. This is proofed from counterfeiting as it is not possible to photocopy or create the random fluorescence pattern of nano particles, as it may be impossible to arrange these particle in exactly the same position and for the particles to emit the same pattern with the same intensity, provided that sufficient amount of nano particle material is used.

BRIEF DESCRIPTION OF THE DRAWINGS

The foregoing and other features of embodiments will become more apparent from the following detailed description of embodiments when read in conjunction with the accompanying drawings. Elements in the figures have not necessarily been drawn to scale in order to enhance their clarity and improve understanding of these various elements and the embodiments of the invention. Further, elements that are known to be common and well understood to those in the industry are not depicted in order to provide a clear view of the various embodiments of the invention. Thus, in the interest of clarity and conciseness, the drawings are generalized in form.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable a person skilled in the art to practice the invention, and it is to be understood that other embodiments may be utilized and that logical, physical, and other changes may be made within the scope of the embodiments. The following detailed description is, therefore, not to be taken as limiting the scope of the invention, but instead, the invention is to be defined by the appended claims.

The present invention discloses a method for authenticating and identifying an object or product. The method includes steps of applying an indicium on the object. The method further has a step of capturing an image of indicium using an image-capturing device. The method also has the step of determining the authenticity of the indicium by comparing the image captured with reference image(s) available in a server database.

Figure 4:
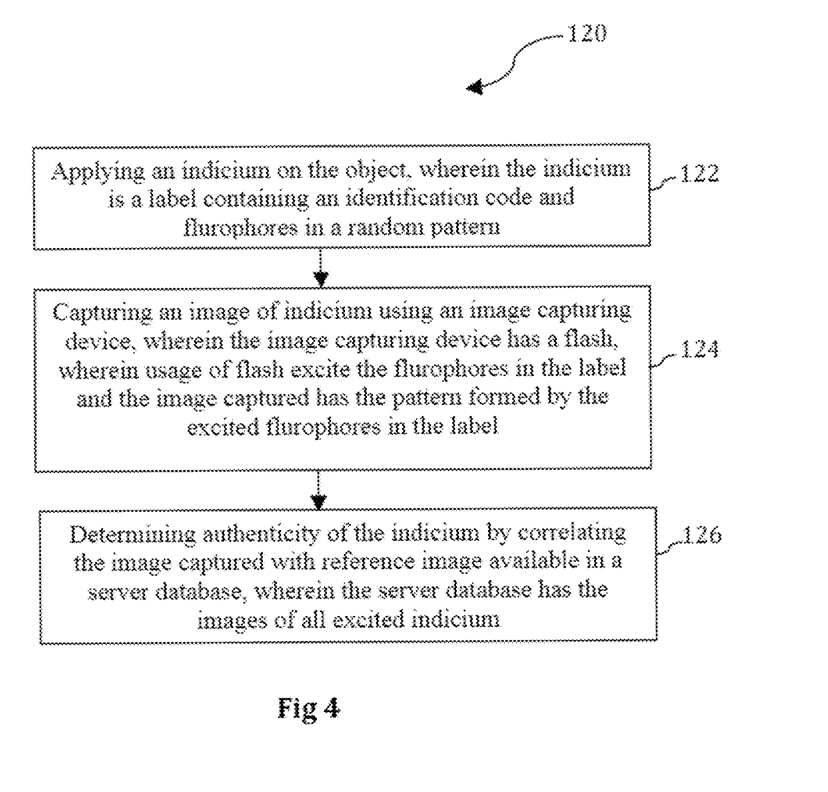
FIG. 4 illustrates the process of the method for authenticating and identification an object in accordance with an embodiment of the invention.

According to an embodiment, the present invention discloses a method for identifying and authenticating an object. The method includes steps as illustrated in FIG. 4; the method 120 has the step 122 of applying an indicium on the object. The indicium is either a label containing fluorophores in a random pattern or a combination of an identification code along with a label containing fluorophores in a random pattern. The fluorophores may be a quantum dots. The quantum dots (QD) are made of semiconductor nano-materials (2 to 10 nanometers) with a unique property. When the quantum dots are subjected to excitation, they emit photons that are visible to the human eye as light (the visible spectrum is 400-700 nm). These emissions depend not only the composition of the material but on the size of the particle. Emissions from smaller sized particles are close to the blue end of the visible spectrum, while larger sized particles emit close to the red end of the spectrum. Thus the QD emissions are tuned by adjusting the size of the nano-particle. The excitation energy is usually in the uv spectrum (200-400 nm) but they may also be excited by radiation up to or close to their emission wavelength. Typical Quantum Dots are composed of CdSe (Cadmium Selenide) or ZnS (Zinc Sulphide), but various other materials are also known to exhibit this property.

Figure 1:
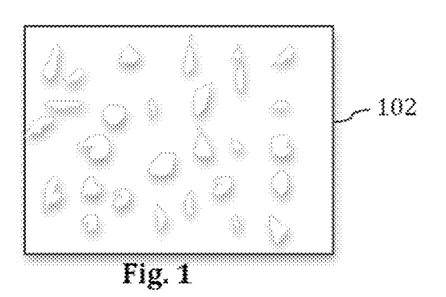
FIG. 1 depicts the magnified random pattern of the fluorophores material applied to a surface in accordance with an embodiment of the invention.
Figure 2:
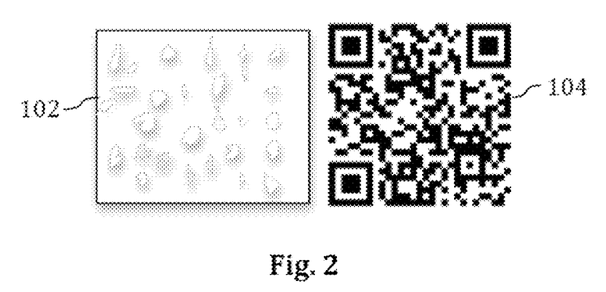
FIG. 2 depicts a typical label with fluorophores material applied next to a printed 2D barcode in accordance with an embodiment of the invention.
Figure 3:
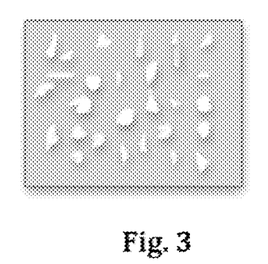
FIG. 3 depicts the emitted photo luminance pattern image in accordance with an embodiment of the invention.

According to an embodiment, the labels are made by applying fluorophores which may include nano-material quantum dots mixed with an appropriate adhesive or binder on a label in random patterns as depicted in FIGS. 1-3. The pattern formed by the fluorophores as shown in 102 may not be discernible to the naked eye due to its very small size and background color. The identification code 104 is printed adjacent to the pattern. The identification code 104 is in the form of a 2D barcode, for example a QR code. The label is exposed to an excitation light source during manufacturing of the label. The excited fluorophores as shown in 106 is in visible spectrum. The emitted photo luminance in the visible spectrum is then recorded via a digital camera. The recorded image is in the form of a random pattern with bright and dark spots. The color of the bright spots corresponds to the emission wavelength (color) of the fluorophores used. This image is then stored in a server database indexed with the identification code which is the serial number printed on the label as contained in the barcode. This image is unique to the label provided a sufficient number of fluorophores particles are applied. This image is similar to the human fingerprint and is used to uniquely identify the label. This label is then applied to any product/object as an effective covert anti-counterfeiting measure.

The method then has the step 124 of capturing an image of indicium using an image-capturing device. The image-capturing device has a flash, wherein usage of flash excites the fluorophores in the label. The image captured has the pattern formed by the excited fluorophores in the label. If the indicium is a combination of the identification code and the fluorophores, then the image captured has the identification code along with the pattern formed by the excited fluorophores in the label. Once the image is captured, the method further has the step 126 of determining the authenticity of the captured image by correlating the captured image with the images of the excited indicium stored in the server database. The authenticity is approved if the correlation of the captured image is above a set threshold. The correlation is a method of mathematical comparison of the stored image against the captured image.

Figure 5:
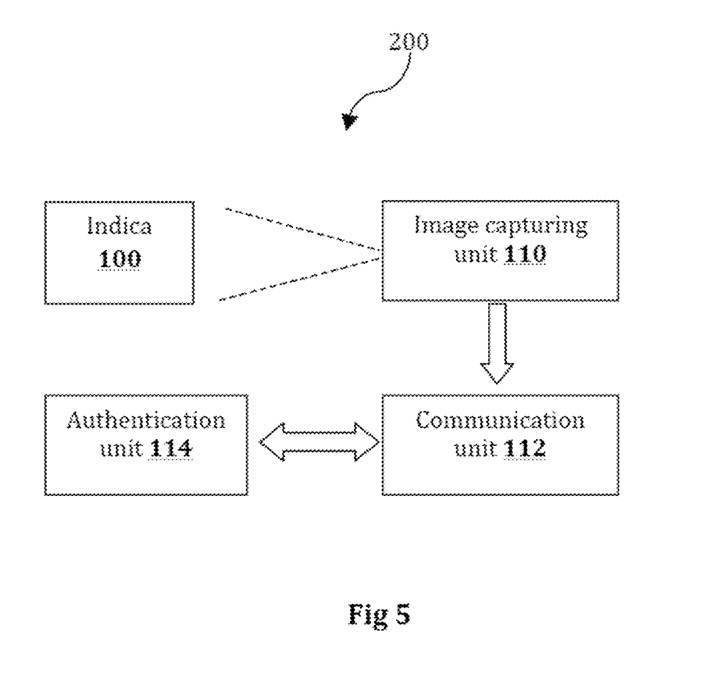
FIG. 5 illustrates the block diagram of the system for authentication and identification of an object in accordance with an embodiment of the invention.

According to an embodiment, the invention also discloses a system for authentication and identification of an object as illustrated in FIG. 5. The system includes an indicium 100 applied on the object. The indicium 100 is a label with fluorophores. It is to be noted that the indicium may also be a combination of an identification code and the label containing quantum dots in a random pattern. The system also has an image-capturing unit 110 with an image-capturing device and a flash, wherein the flash excites the fluorophores in the label of the indicium 100 and the image-capturing device captures the image formed by the excited fluorophores along with the identification code of the indicium 100. If the indicium 100 is a combination of an identification code 104 and the label containing fluorophores 102 in a random pattern then the image-capturing device captures the image formed by the excited fluorophores along with the identification code of the indicium 100. In order to enhance the sensitivity of the image-capturing device, and to reduce the influence of ambient light, an appropriate filter 115 may be placed in front of the camera lens. The recorded image is in the form of a random pattern. The system 200 further has a communication unit 112 to transmit the captured image of the indicium 100 to an authentication unit 114. The authentication unit 114 has a server database with a plurality of excited indicia images used in a plurality of objects. The indicia images are indexed with an identification code, which helps in speedy authentication of the indicium. Then the authentication unit 114 authenticates the captured image by correlating the captured image with respect to the stored image and transmits a result of authentication to the communication unit.

The image capturing unit may be a mobile electronic device which is typically a cellular telephone or smartphone that has a built-in imaging device, but can also be a personal digital assistant (PDA), a tablet, a computer, an e-reader, a media player, a digital camera or similar electronic device having a built-in imaging device with a flash, especially one that is normally readily at hand to the average user. No special skill set is required for the user to capture and identify the authentication of the product.

According to an embodiment, any user who may be a consumer in the field is empowered to authenticate the product using an application operational on any smart phone with a digital camera and flash.

Figure 6:
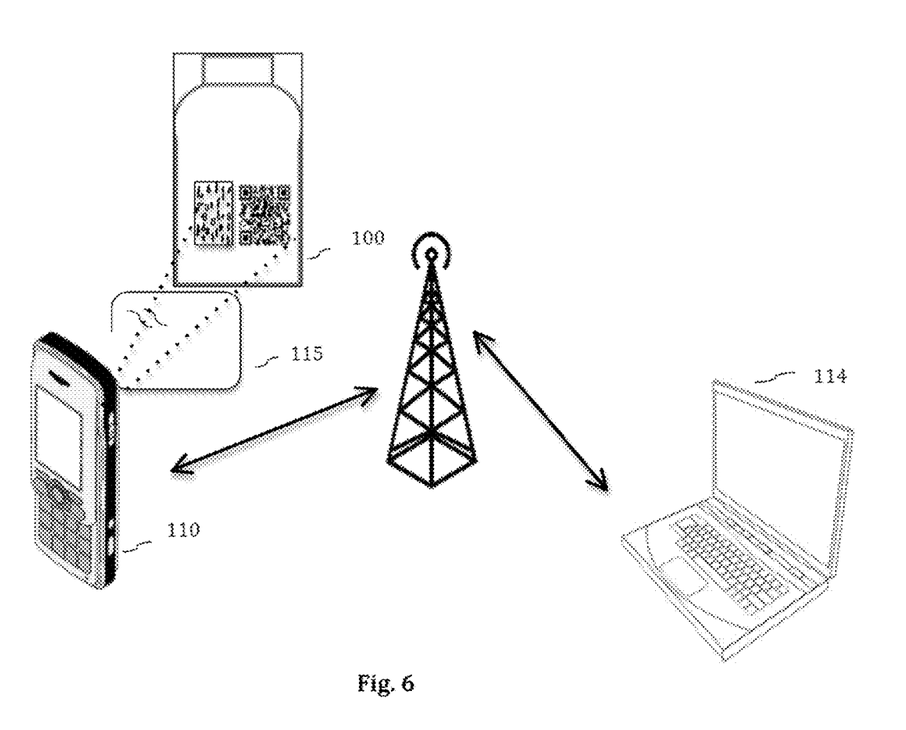
FIG. 6 illustrates the typical authentication system of an object with the label, a mobile phone with camera, mobile telephone network, and the remote server.

According to an embodiment, the system for authentication and identification of an object is as illustrated in FIG. 6. The user launches a mobile authentication application on his smart phone; this allows the user to view the barcode on the mobile phone screen via the phone's built-in camera, which acts as the image-capturing unit 110. When the barcode is in the center of the screen, the user presses the camera trigger button on the phone. The application then captures an image of the indicium including the area around the barcode, while illuminating it with the built-in flash. Illuminating the indicium excites the fluorophores which then emit photo luminance. The image captured shows the emitted photo luminance from the material applied adjacent to the barcode. This image, which also contains the barcode image, is transmitted to a remote server, which is the authentication unit of the system. The server contains the database of reference images captured at the time the label was manufactured. The reference image is located using the serial number in the barcode, and the two images - the reference and the incoming one of the emitted luminance - are correlated (i.e., compared mathematically) to verify the authenticity of the label. The result of the comparison is a score that indicates how close the incoming image is to the reference. The score is compared to a minimum acceptable score to declare the label as authentic. Any product with a label that scores below the minimum acceptable score is declared as counterfeit. This result is then conveyed to the user via the mobile application.

According to another embodiment, the indicium is made from phosphors (luminescent convertors), or other materials, that have the following property: when they are subjected to illumination in the visible electromagnetic spectrum (400 to 650 nm), they absorb the light energy and re-emit luminance in the near infrared (690 to 800 nm) electromagnetic spectrum. Materials that exhibit this property include Cr 3+doped $Zn_3Ga_2Ge_2O_{10}$. The emission also persists after the excitation is removed. This emission is invisible to the human eye. This property of the material is used to create a covert consumer authenticable anti-counterfeiting feature.

According to the embodiment, the above identified material is mixed with an adhesive and applied on a label in random patterns. The pattern may not discernible to the naked eye due to the very small size of the particles and background color or printed background. Adjacent to the pattern, we print a unique serial number in the form of a 2D barcode, for example a QR code. In certain scenarios, the pattern may be embossed on top of the unique serial number, or the identification code may be embossed on the pattern. At the time of manufacture the label is exposed for a short period to a visible light source. The emitted photo luminance in the infrared spectrum is then recorded via a digital camera. Digital cameras are sensitive to infrared emission and allow the detection and imaging of emitted photo luminance. To enhance the sensitivity of the camera and to reduce the influence of visible light, an infrared filter may be placed in front of the camera lens. The recorded image is in the form of a random pattern. This image is then stored in a database indexed with the serial number printed on the label (in the barcode). This image is unique to the label provided a large number of phosphor particles are applied. This image is similar to the human fingerprint and can be used to uniquely identify the label. This label can then be applied to any product/object as an effective covert anti-counterfeiting measure. To verify the authenticity, an emission image is captured and compared to the reference image in the server database.

According to an embodiment of the invention, the indicium is a combination of the identification code and the random pattern of fluorophores. The combination of the identification code and the random pattern may be in any of the following ways: i) a combination of an identification code embossed on top of the random pattern of fluorophores ii) a combination of a random pattern of fluorophores embossed on top of the identification code, or ii) a combination wherein an identification code and the random pattern of fluorophores are next to each other.

According to another embodiment of the invention, a filter may be used to attenuate the light from the excitation source, such as the flash, from entering the image capturing device. The filter may be an infra-red filter or any other optic filter. In certain scenarios, the images captured for correlation are a sequence of images, which include images captured with flash and without flash in order to obtain the image of the indicium both when the fluorophores are unexcited and excited. The order of capturing the images may depend on the type of fluorophore used. These sequences of images are used to correlate and authenticate the product/object. In some cases, the flash may have to be on for a period of time (say, 2 seconds) to excite the fluorophores, i.e. a sequence of images captured under various flash conditions is used for correlation.

Figure 7:
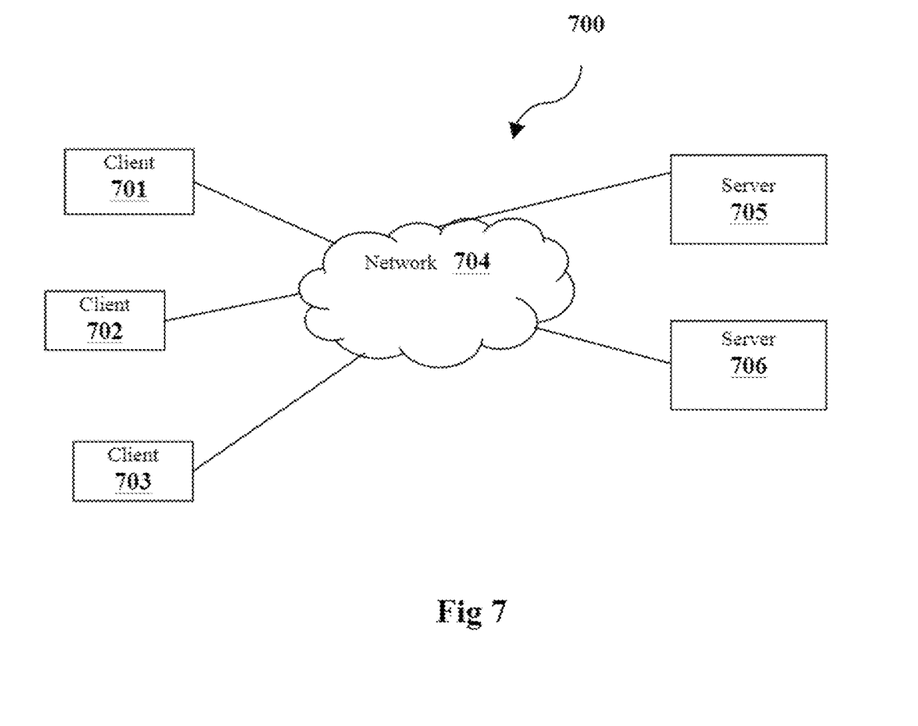
FIG. 7 illustrates an exemplary environment in which systems and methods consistent with the principles of the invention may be implemented.

FIG. 7 illustrates an exemplary environment in which systems and methods consistent with the principles of the invention may be implemented. The network consists of several clients (701, 702, 703) where the system and method of authenticating and identifying an object is implemented. These clients (701, 702, 703) interact with the server (705) and transmit the various data required for the system and method for identification and authentication of an object over a network (704). The server (705) uses various databases to receive and correlate the images received from the client. In some embodiments, the server (705) may also connect to another server (706). Here, the image-capturing device along with the communication unit acts as the client.

In practice, there may be more numbers of servers and clients. In some situations, a server may perform the functions of both servers (705, 706) illustrated in the FIG. 7. It is possible that there may be multiple servers. It is also possible that in the case of a standalone application mode, a server may not exist and all the logic may be implemented in the mobile application.

A client (701) may include any device such a personal computer, laptop, mobile device, tablet, camera or any other types of device that can support two-way interactions with the user either using a graphical user interface or through other interface mechanisms such as voice or gesture or video. It is to be noted that the image-capturing device may interact with the client to transmit the image to the authentication unit. Thus, the client (701) may be any device that is capable of displaying or receiving information related to the system. It may also be the user's smart phone. Still further, the client (701) could be a dedicated device designed specifically for this application, comprising an illumination source, an image capturing device for capturing the image, and a communication device to transmit the image to the authentication unit.

In some cases, all or part of the server configurations may run on the client (101). In some cases, the client (701) may connect to multiple servers during the process of managing activity. In certain scenarios, the client (701) may perform the functions of a server or the server may perform client functions.

The above-mentioned functions may be part of one server or several servers, and each server may implement the functionalities of others. It may be possible that any of the servers may be implemented using a cluster of servers involving two or more separate devices with all the other associated devices like a load balancer, a firewall, routers etc.

The network (704) may include, for example, a local area network (LAN), a wide area network (WAN), a Wide Local Area Network (WLAN), Wireless Personal Area Network (WPAN), and Wireless Metropolitan Area Network (WMAN), a telephone network, such as the Public Switched Telephone Network (PSTN), an intranet, the Internet, a memory device, or a combination of networks. The network (104) may be wired, wireless, optical, or use or be part of any other information transmission mechanisms.

The disclosed invention provides an easy to use economical method of authenticating an object. Here, the consumer is able to authenticate the product. The disclosed method is proofed from counterfeiting, as it is not possible to photocopy or create the random pattern of nano-particles, provided a sufficient amount of nano-particle material is used. One of the major advantages of this method is that authentication and identification of the object does not require proprietary readers to read the indicium; any smart phone with a camera and a flash that interacts with the server is capable of identifying and authenticating the object.

The invention claimed is:

1. A method for authenticating and identifying an object, the method comprising:
   a) applying an indicium on the object, wherein the indicium is a combination of an identification code and a label containing fluorophores in a random pattern;
   b) capturing at least one image of the indicium using an image capturing device, wherein the image capturing device has an illumination source, wherein the illumination source is activated, before or during the capture of the image, to excite the fluorophores of the indicium and the image captured has the identification code along with the emitted fluorescence pattern formed by the excited fluorophores in the label;
   c) determining the authenticity of the indicium by correlating the image captured with data available in a server database, wherein the server database has the images of all the emitted fluorescence patterns indexed using the identification code.

2. The method as claimed in claim 1, wherein the identification code is at least one of several machine-readable codes.

3. The method as claimed in claim 2, wherein the indicium is the combination of at least one of the identification codes embossed on top of the label with a random pattern of fluorophores, the label with a random pattern of fluorophores embossed on top of the identification code or the identification code and the label with a random pattern of fluorophores are next to each other.

4. The method as claimed in claim 1, wherein the image capturing device captures a sequence of images of the indicium image when excited with an illumination source and without excitation, wherein the combination of the image captured before excitation and after excitation is used for correlation in the step of determining the authenticity of the indicium.

5. The method as claimed in claim 1, wherein the image capturing step further utilizes at least one filter to attenuate the light from the excitation source entering the image capturing device or to enhance the sensitivity of the image capturing device to the emissions from the fluorophores.

6. A system for authentication and identification of an object, the system comprising:
   a) an indicium applied on the object, wherein the indicium is a combination of an identification code and a label containing a plurality of fluorophores in a random pattern;
   b) an image capturing unit which comprises an image capturing device, and an illumination source in the form of a flash, wherein the flash excites the fluorophores in the label and the image capturing device captures the image formed by the excited fluorophores along with the identification code of the indicium;
   c) a communication unit to transmit the captured image of the indicium to an authentication unit for authentication, wherein the authentication unit gets a stored image from a server database, wherein the server database has a plurality of indicia image used in a plurality of objects, wherein the indicia image is indexed with the identification code; and the authentication unit authenticates the captured image by correlating the captured image with respect to the stored image and transmits a result of authentication to the communication unit.

7. The system as claimed in claim 6, wherein the image capturing device is at least one of a smartphone camera and a digital camera.

8. The system as claimed in claim 6, wherein the indicium is the combination of at least one of the identification codes embossed on top of the random pattern of fluorophores on the label, or the random pattern of fluorophores is embossed on top of the identification code, or the identification code and the random pattern of fluorophores are next to each other on the label.

9. The system as claimed in claim 6, wherein the identification code is at least one barcode from a plurality of machine-readable codes.

10. The system as claimed in claim 6, wherein the image-capturing device further has at least one filter to attenuate the illumination from the excitation source entering the image-capturing device or to enhance the sensitivity of the image-capturing device to the emission from the excited fluorophores.

11. The system as claimed in claim 6, wherein the random pattern on the label is made with combinations of multiple fluorophore types with fluorescence of different wavelengths, thus producing a multi-colored fluorescing pattern.

* * * * *